(12) United States Patent
Lee

(10) Patent No.: US 10,612,924 B2
(45) Date of Patent: Apr. 7, 2020

(54) CONSTRUCTION DEVICE

(71) Applicant: Graham Lee, Bradford (GB)

(72) Inventor: Graham Lee, Bradford (GB)

( * ) Notice: Subject to any disclaimer, the term of this patent is extended or adjusted under 35 U.S.C. 154(b) by 0 days.

(21) Appl. No.: 16/474,495

(22) PCT Filed: Jun. 7, 2018

(86) PCT No.: PCT/GB2018/051550
§ 371 (c)(1),
(2) Date: Jun. 27, 2019

(87) PCT Pub. No.: WO2019/008313
PCT Pub. Date: Jan. 10, 2019

(65) Prior Publication Data
US 2019/0339076 A1 Nov. 7, 2019

(30) Foreign Application Priority Data

Jul. 3, 2017 (GB) .................................. 1710635.2

(51) Int. Cl.
*G01C 15/10* (2006.01)
*E04G 21/18* (2006.01)

(52) U.S. Cl.
CPC ......... *G01C 15/10* (2013.01); *E04G 21/1808* (2013.01)

(58) Field of Classification Search
CPC . G01C 15/10; E04G 21/1808; E04G 21/1816; E04G 21/1833
(Continued)

(56) References Cited

U.S. PATENT DOCUMENTS 1,909,267 A * 5/1933 Golt .................... E04G 21/1808
33/339
2,503,098 A * 4/1950 Crocker .............. E04G 21/1825
33/410
(Continued)

FOREIGN PATENT DOCUMENTS

CN 201187153 Y 1/2009
CN 205558317 U 9/2016
(Continued)

OTHER PUBLICATIONS

Intellectual Property Office, Great Britain Search Report for Great Britain Application No. GB1710635.2, dated Dec. 6, 2017, 4 pages, United Kingdom.
(Continued)

*Primary Examiner* — Christopher W Fulton
(74) *Attorney, Agent, or Firm* — Alston & Bird LLP

(57) ABSTRACT

The present invention provides a device (100) for suspending a plumb line over a corner region of a wall to be built, comprising an elongate support member (102) having a first end region (104) and a second end region (106); a first locating region (108) disposed proximal the first end region for locating the device on a first support surface; and a second locating region (112) disposed between the first end region and the second end region for locating the device on a second support surface, wherein the first locating region and/or the second locating region is/are selectively movable in at least a longitudinal direction relative to the elongate support member. A kit and method of suspending a plumb line over a corner region of a wall to be built are also provided.

17 Claims, 2 Drawing Sheets

(58) Field of Classification Search
USPC .......... 33/370, 371, 392, 404, 407, 408, 410
See application file for complete search history.

(56) References Cited

U.S. PATENT DOCUMENTS

| | | | | |
|---|---|---|---|---|
| 2,623,289 A | * | 12/1952 | Kampel | .............. E04G 21/1808 33/406 |
| 2,761,214 A | * | 9/1956 | Ruble | ................. E04G 21/1816 33/406 |
| 2,832,143 A | * | 4/1958 | Davis | ................. E04G 21/1816 33/406 |
| 3,063,152 A | * | 11/1962 | Colbert | .............. E04G 21/1816 33/406 |
| 3,127,683 A | * | 4/1964 | Garton | ................ E04G 21/1816 33/406 |
| 3,201,870 A | * | 8/1965 | Barlow | .............. E04G 21/1825 33/407 |
| 4,970,797 A | * | 11/1990 | Sarasin | .............. E04G 21/1808 33/404 |
| 5,038,493 A | * | 8/1991 | Stabs | ....................... G01B 3/08 33/809 |
| 5,136,785 A | | 8/1992 | Shirley | |
| 5,274,929 A | | 1/1994 | Tocci | |
| 5,481,809 A | | 1/1996 | Rooney | |
| 2005/0193580 A1 | | 9/2005 | Alecci | |
| 2008/0072441 A1 | * | 3/2008 | Charpentier | ........ E04G 21/1825 33/407 |

FOREIGN PATENT DOCUMENTS

| | | |
|---|---|---|
| CN | 106679641 A | 5/2017 |
| FR | 2441702 A1 | 6/1980 |
| FR | 2999207 A1 * | 6/2014 |
| GB | 2376711 A | 12/2002 |

OTHER PUBLICATIONS

International Searching Authority, International Search Report and Written Opinion for International Application No. PCT/GB2018/051550, dated Sep. 5, 2018, 12 pages, European Patent OFfice, the Netherlands.

* cited by examiner

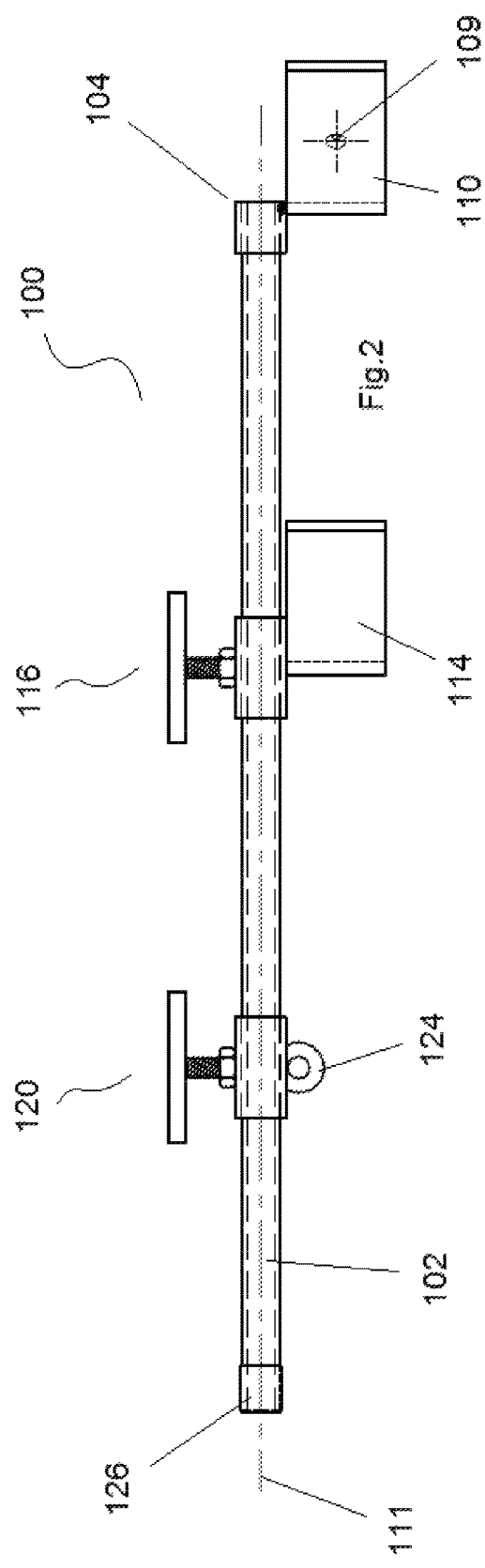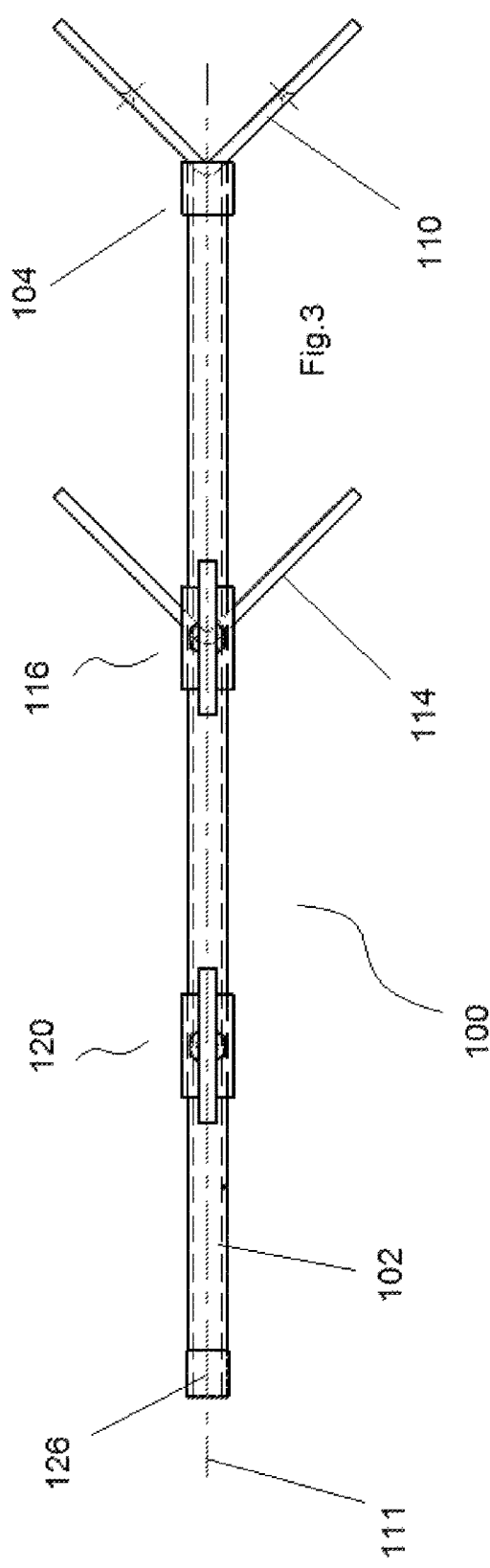

CONSTRUCTION DEVICE

CROSS REFERENCE TO RELATED APPLICATIONS

This application is a National Stage Application, filed under 35 U.S.C. 371, of International Application No. PCT/GB2018/051550, filed Jun. 7, 2018, which claims priority to United Kingdom Application No. 1710635.2, filed Jul. 3, 2017; the contents of both of which as are hereby incorporated by reference in their entirety.

BACKGROUND

Related Field

The present invention relates to construction, such as building a dwelling, and particularly to masonry using stones, bricks, blocks, or the like, to build a wall. In particular, but not exclusively, the present invention relates to a device and method for accurately constructing a corner of a building in an efficient and aligned manner.

Description of Related Art

Conventional bricklaying typically begins at the corners of a building being constructed and a bricklayers' mantra is 'level, gauge, plumb and straighten'. 'Level' refers to checking the horizontal orientation and alignment of the upper faces of a course of bricks with a spirit level. 'Gauge' refers to adjusting the depth of mortar between the bed joints so that the brick courses at the corners are the same height and so that the top of a window or door frame, for example, is reached with an exact number of brick courses. A gauge board or measure is typically used for this purpose. 'Plumb' refers to checking the vertical orientation and alignment of the front faces of the bed courses with a spirit level. 'Straighten' refers to the step of building corners when the bricklayer will plumb the front and end faces of the corner (or 'quoin') brick and then plumb the edge of the brick at the end of the run, three or four bricks away from the corner. He will then use the straight edge of the spirit level to check the straightness of the bricks in between and any that are out of alignment will be tapped into place using the edge of his trowel.

However, conventional methods of bricklaying, particularly when constructing a corner, are time consuming, inefficient, costly, inaccurate and largely depend on labourer experience to achieve a well plumbed corner in an efficient and consistent manner. These problems are exaggerated when working with more irregular materials such as stone where the front (face) surfaces of each stone are uneven and inconsistent making alignment more difficult. It is known for a plumb line to be used in an attempt to set an accurate vertical reference line to work to when constructing a corner. However, such methods typically involve tying a plumb line to a piece of timber precariously weighted down on top of the inner leaf of a cavity wall construction which has many limitations and risks.

BRIEF SUMMARY

It is an aim of certain embodiments of the present invention to provide a device and method for constructing a corner region of a building in an accurate, consistent and efficient manner.

It is an aim of certain embodiments of the present invention to provide a device which can be efficiently, securely and safely mounted over a corner region of a building to be constructed in a variety of materials and which is configured to support a plumb line for referencing the corner region to during construction thereof.

It is an aim of certain embodiments of the present invention to provide a device which is adjustable, non-complex to use, accurate, compact, hardwearing, and lightweight.

According to a first aspect of the present invention there is provided a device for suspending a plumb line over a corner region of a wall to be built, comprising:

an elongate support member having a first end region and a second end region;

a first locating region disposed proximal the first end region for locating the device on a first support surface; and a second locating region disposed between the first end region and the second end region for locating the device on a second support surface, wherein the first locating region and/or the second locating region is/are selectively movable in at least a longitudinal direction relative to the elongate support member.

Optionally, the first locating region and/or the second locating region is/are selectively rotatable relative to the elongate support member.

Optionally, the first locating region comprises a pair of first engagement surfaces defining a first angle therebetween.

Optionally, the first angle is substantially around 90°.

Optionally, the first angle is dissected substantially equally by a longitudinal axis of the elongate support member.

Optionally, each of the first engagement surfaces comprises at least one through hole.

Optionally, the second locating region comprises a pair of second engagement surfaces defining a second angle therebetween.

Optionally, the second angle is substantially the same as the first angle.

Optionally, the second angle is substantially around 90°.

Optionally, the second angle is dissected substantially equally by a longitudinal axis of the elongate support member.

Optionally, the second engagement surfaces are coupled to the elongate support member by a first coupling member slidably mounted thereto between the first and second end regions.

Optionally, the first coupling member is configured to selectively rotate relative to the elongate member.

Optionally, the first coupling member comprises a first locking element to lock the first coupling member and second engagement surfaces in a desired position and/or orientation relative to the elongate support member.

Optionally, the device further comprises a second coupling member for coupling a plumb line to the second end region of the elongate support member.

Optionally, the second coupling member is slidably mounted to the elongate support member proximal the second end region thereof.

Optionally, the second coupling member is configured to selectively rotate relative to the elongate member.

Optionally, the second coupling member comprises a second locking element to lock the second coupling member in a desired position and/or orientation relative to the elongate support member.

Optionally, the second coupling member comprises an attachment element for attaching a plumb line thereto.

Optionally, the attachment element comprises a ring, loop, hole, hook or the like.

According to a second aspect of the present invention there is provided a kit comprising a device according to the first aspect of the present invention and a plumb line.

According to a third aspect of the present invention there is provided a method of suspending a plumb line over a corner region of a wall to be built, comprising:

selectively moving a first locating region and/or a second locating region of a device in at least a longitudinal direction relative to an elongate support member of the device, such that the first locating region engages a first support surface and the second locating region engages a second support surface; and coupling a plumb line to an end region of the elongate support member.

Optionally, the method further comprises selectively rotating the first locating region and/or the second locating region relative to the elongate support member.

Optionally, the method further comprises attaching the first locating region to the first support surface.

Optionally, the method further comprises sliding a first coupling member along the elongate support member to move the second locating region towards or away from the first locating region.

Optionally, the method further comprises locking the first coupling member in a desired position and/or orientation relative to the elongate support member.

Optionally, the method further comprises coupling the plumb line to the second end region of the elongate support member by a second coupling member.

Optionally, the method further comprises selectively translating and/or rotating the second coupling member relative to the elongate support member to accurately position the plumb line.

Optionally, the method further comprises locking the second coupling member in a desired position and/or orientation relative to the elongate support member.

BRIEF DESCRIPTION OF THE FIGURES

Certain embodiments of the present invention will now be described with reference to the accompanying drawings in which:

FIG. 2 illustrates a side view of the device of FIG. 1; and

FIG. 3 illustrates a plan view of the device of FIGS. 1 and 2.

DETAILED DESCRIPTION OF VARIOUS EMBODIMENTS

Figure 1:
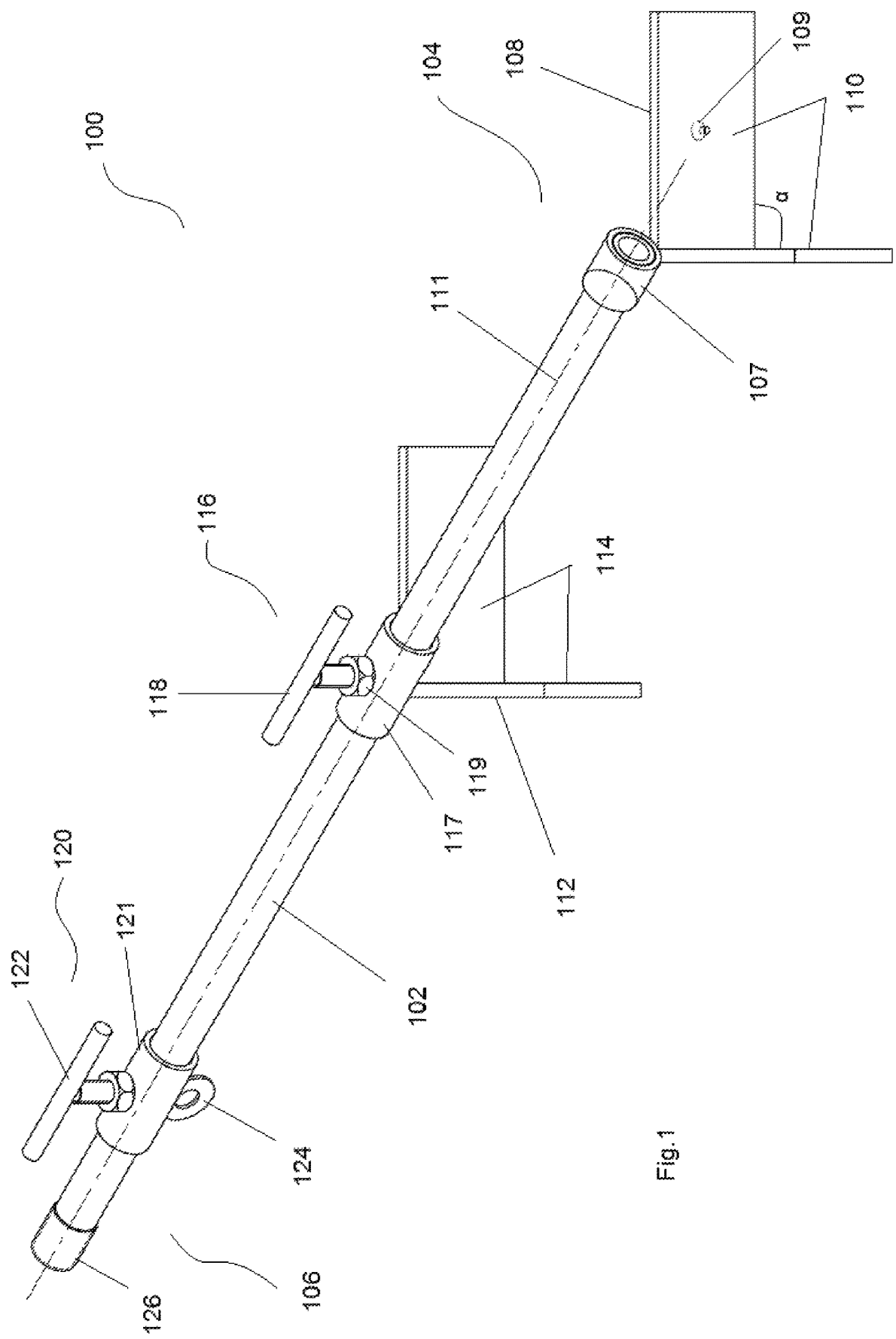
FIG. 1 illustrates an isometric view of a device according to certain embodiments of the present invention.

As illustrated in FIG. 1, a device 100 according to certain embodiments of the present invention includes an elongate member 102 having a first end region 104 and a second end region 106. The elongate member 102 is aptly hollow to ensure weight is minimised and for ease of handling etc. but it may be solid. The elongate member 102 is substantially tubular and aptly has a substantially circular cross section.

A first locating portion 108 is provided at the first end region 104 of the elongate member 102 for locating the device 100 on a suitable support surface, such as the inner face of an inner leaf of a part-built cavity wall construction, or an outer face of a timber frame construction. The first locating portion 108 provides at least one first engagement surface 109 for engagement with a suitable support surface. As illustrated, a pair of first plates 110 are aptly provided which define an angle α between respective engagement surfaces thereof. Aptly, the first plates 110 define a 90° angle therebetween for engagement with the inner corner faces of the inner leaf (typically blockwork) of a cavity wall construction. Aptly the angle α is dissected substantially equally by a longitudinal axis 111 of the elongate support member. Aptly the corner defined by the plates is as tight as possible to engage well with a corresponding corner angle of the inner leaf of the cavity wall construction. The first engagement surfaces may be provided by a single piece of angle section or may be provided by two plates welded together for example. Alternatively, the first plates 110 may be spaced apart from each other and attached separately to the first end region 104 of the elongate member 102 whilst defining the desired angle, e.g. 90°, therebetween. Furthermore, the first plates 110 may be configured to define other suitable angles between each other for engagement with support surfaces, e.g. the inner faces of an inner wall leaf, which are angled at more or less than 90° to each other. Each plate is sized and shaped to provide a sufficient area for secure engagement with a respective support surface as is described further below. Each plate 110 is substantially rectangular but may be any suitable shape and size, e.g. substantially square or the free ends of each plate may be curved. Alternatively, the first locating portion 108 may provide a single engagement surface oriented substantially 90° to the longitudinal axis of the elongate support member 102 for engagement with a substantially planar support surface.

The first locating portion 108 may be fixed to the first end region 104 of the elongate member 102 or removably attached to the first end region 104. The first locating portion 108 may be adjustable relative to the elongate member 102, e.g. selectively movable along the elongate member and/or rotatable relative to a longitudinal axis 111 of the elongate member 102. Where the first locating portion 108 is adjustable relative to the elongate member 102, aptly a locking mechanism is provided to lock the first locating portion 108 in a selected position and/or orientation relative to the elongate member 102. In the illustrated embodiment, the first plates 110 are provided by a single piece of angle section welded to a relatively short length of tubing 107 which in turn has been located on and welded to the first end region 104 of the elongate member 102. Each of the first plates 110 has a hole 109 therein to allow the first locating portion 108 to be attached to the support surface, e.g. an inner face of an inner wall leaf, by suitable fasteners, e.g. a screw in each hole. These holes also allow the device 100, in particular the elongate support member 102, to be securely attached to a variety of different support surfaces of different forms and materials, e.g. an upright member of a timber frame construction by at least the first locating portion 108.

A second locating portion 112 is provided between the first and second end regions 104, 106 of the elongate member 102 for locating the device 100 on a suitable further support surface, such as the outer face of the inner leaf of a cavity wall construction. The second locating portion 112 provides at least one second engagement surface for engagement with the suitable further support surface. As illustrated, a pair of second engagement surfaces are aptly provided by a pair of second plates 114 wherein the second engagement surfaces define a second angle therebetween which is aptly the same as the first angle defined between the first engagement surfaces. Aptly, the second plates 114 define a 90° angle therebetween for engagement with the outer corner faces of the inner leaf of a cavity wall construction. Aptly the second angle is dissected substantially equally by the longitudinal axis 111 of the elongate support member. The second locating region 112 provides additional security, stability and support to the device when mounted on a part-built cavity wall construction. The second engagement surfaces may be provided by a single piece of angle section or by two plates welded together for example. Alternatively, the second plates 114 may be spaced apart from each other and coupled separately to the elongate member 102 whilst defining the desired angle, e.g. 90°, therebetween. Furthermore, the second plates 114 may be configured to define other suitable angles between each other for engagement with suitable support surfaces, e.g. the outer faces of an inner wall leaf, which are angled at more or less than 90° to each other. The angle defined by the second plates 114 is aptly the same as the of the angle defined by the first plates 110 but may be different if required. Each plate is sized and shaped to provide a sufficient area for secure engagement with a respective support surface as described further below. Each plate is substantially rectangular but may be any suitable shape and size, e.g. substantially square or the free ends of each plate may be curved. The longitudinal axis 111 of the elongate member 102 substantially dissects the 90° angle between both sets of plates equally, i.e. at 45°, such that the elongate member substantially aligns with a corner of an outer wall to be built accurately and efficiently using the device. Alternatively, the second locating portion 112 may provide a single engagement surface oriented substantially 90° to the longitudinal axis of the elongate support member 102 for engagement with a substantially planar second support surface.

As illustrated in FIG. 1, the second plates 114 are attached, e.g. by welding, to a first coupling member 116 which is slidable along the elongate member 102 to allow a position of the second plates 114 relative to the first plates 110 to be adjustable in a direction along the longitudinal axis of the elongate member 102. The desired distance between the first and second plates may correspond to the thickness of the inner leaf of a cavity wall construction to which the device is to be attached. The first coupling member 116 comprises a hollow tube section 117 having an inner diameter sized to slidably engage the outer surface of the elongate member 102. Aptly, the elongate member 102 and the first coupling member 116 are both substantially circular in cross section which allows for both translational and rotational adjustment of the second plates 114 relative to the longitudinal axis 111 of the elongate member 102. If translation only was required, other suitable cross sections for the elongate member 102 and first coupling member 116 may be suitable, such as square or rectangular box section for example.

When a desired position and/or orientation has been set, a first locking member 118 locks the first coupling member 116 relative to the elongate member 102. The first locking member 118 as illustrated comprises a T-bar having a handle portion for manually rotating the same and a threaded portion which is received by a correspondingly threaded hole of the first coupling member 116 and which engages the outer surface of the elongate member 102 to lock itself thereto. The threaded hole is provided by a nut 119 welded to the tube section of the first locking member. The first locking member 118 as illustrated allows the coupling member to be locked at any position and orientation on the elongate member as desired depending on a distance between the inner and outer faces of a suitable support such as the inner leaf of a cavity wall construction. In this manner, the first and second locating regions 108, 112 are configured to clamp a wall leaf therebetween to securely mount the device thereon in an efficient and stable manner. Other suitable locking mechanisms can be envisaged such as a pin which is received by a hole in the first coupling member and which engages one of a number of spaced apart holes provided along the elongate member at predetermined locations. Further alternatively, the locking mechanism may rely simply on an interference fit between the inner surface of the coupling member and the outer surface of the elongate member, or via a bush provided therebetween, to provide a frictional force which allows the first coupling member and second plates attached thereto to be moved relative to the elongate member to a desired position/orientation whilst ensuring it remains in that position/orientation. Relying on such a frictional arrangement may be suitable for relatively lightweight applications. An alternative embodiment may include a ratchet mechanism which allows the second set of plates 114 to be moved along the elongate member 102 towards the first set of plates 110 to thereby clamp the inner cavity wall leaf therebetween and securely lock the second plates in position. Such a ratchet mechanism may also be releasable such that the second set of plates 114 can be moved away from the first set of plates 110 to release the device from the inner cavity wall leaf.

A further coupling member 120 is provided proximal the second end region 106 of the elongate member 102 for hanging a plumb line from. The further or second coupling member 120 comprises a tubular main section 121 like the first coupling member 116 to allow the same to be translatable and rotatable relative to the elongate member 102 as desired. A second locking member 122 is provided to lock the second coupling member 120 relative to the elongate member 102 when a desired position and/or orientation of the same has been set by a user. As described for the first locking member, other suitable mechanisms/configurations of the second locking member can be envisaged. The second coupling member 120 has a ring 124 extending from its outer surface which may be an integral portion of the coupling member or may be attached thereto, e.g. by welding. Other forms of attachment element for attaching a plumb line to the second coupling member 120 may be used, such as a loop, hook, shackle, hole, or the like. The translational and rotational adjustment of the second coupling member 120 relative to the elongate member 102 desirably allows for particularly accurate and small adjustments to be made to the position of a plumb line extending downwardly from the second end region 106 of the elongate member 102 in both the longitudinal and lateral directions relative to the axis 111 of the elongate member. The ring 124 may aptly be rotatable relative to the tubular section of the second coupling member 120 to provide additional adjustment. A plumb line may alternatively be simply tied to the second end region of the elongate member by way of a loop which would allow for some adjustment longitudinally but not laterally and which may also easily be knocked or blown out of position in use. An end cap 126 made from a suitable material, such as PVC, is located on the second end of the elongate member 102 to close off that end to prevent the ingress of water/dirt and to protect a user from any relatively sharp edges at that end region. A similar end cap may be provided at the first end region of the elongate member 102.

The elongate support member 102 is around 600 mm long and has an outer diameter of around 19 mm and a wall thickness of around 2.5 mm. Each of the first and second plates 110,114 is around 100 mm long, around 50 mm wide, and around 6 mm thick. The tubular section 107 attaching the first plates 110 to the elongate member 102 is around 25 mm long and has an outer diameter of around 25 mm and a wall thickness of around 2.5 mm. Each of the coupling members 116,120 has a tubular main section which is around 50 mm long and has an outer diameter of around 25 mm and a wall thickness of around 2.5 mm to have a sliding engagement with the elongate member 102. The handle of each rotatable T-bar locking element is around 75 mm long and has an outer diameter of around 8 mm. The shaft of each locking element is around 28 mm long and engages with a correspondingly threaded M10 hex nut. The ring 124 has an outer diameter of around 25 mm. The key components of the device 100 are aptly zinc plated mild steel but may be any suitable material for a particular application, such as other forms of steel, aluminium, plastics material, or a combination of different materials for different components such as a metal elongate member and plastic coupling members for example.

An exemplary method of using the device will now be described. The device 100 is offered up to an inner leaf of a part-built cavity wall which is typically formed from blockwork and mortar. The first set of plates 110 is engaged snugly into the corner of the inner leaf of the cavity wall construction such that the outer engagement surfaces of the plates 110 abut the inner faces of the inner leaf. The first coupling member 116 is then unlocked with respect to the elongate member 102 by rotating the T-bar handle 118 in a first direction which is generally anticlockwise. The first coupling member 116 along with the second set of plates 114 is slid along the elongate member 102 towards the first set of plates 110 until the inner engagement surfaces of the second plates 114 engage the outer faces of the inner leaf of the cavity wall construction. Rotational adjustment of the first coupling member 116 and second set of plates 114 is performed if required to accurately align the engagement surfaces thereof with the outer faces of the inner leaf. The first coupling member 116 is then locked in position on the elongate member 102 by rotating the T-bar handle 118 in the other direction which is generally clockwise. The device is now securely mounted on the inner leaf to ensure the elongate member, and particularly its second end region 106, is secure and stable relative to the inner leaf. A plumb line is then attached to the ring 124 of the second coupling member 120 and, in an unlocked state, the second coupling member 120 is slid along the elongate member 102 in either direction until the plumb line is accurately aligned with a corner of at least one course of an outer leaf to be built to complete the cavity wall construction. The position of the plumb line with respect to the corner of the part-built outer leaf is confirmed and adjusted accordingly using a vertically oriented spirit level. Additional and fine lateral adjustment of the plumb line can be performed if required by rotating the second coupling member 120 relative to the elongate member 102. When the plumb line is in a desired position with respect to a corner to be built, the second coupling member 120 is locked in place on the elongate member 102 by rotating the respective T-bar locking element 122. The corner region of the outer leaf of the cavity wall construction can then be built in a particularly accurate and efficient manner which helps to reduce labour time and cost and also material in the form of stone/brick/blockwork and/or mortar which is otherwise wasted when an unaligned corner region has to be dismantled and rebuilt. The device therefore also has environmental benefits.

Certain embodiments of the present invention therefore provide a device and method for constructing a corner region of a building in an accurate, consistent and efficient manner, particularly when the building material is stone. The device can be efficiently, securely and safely mounted over a corner region of a building to be constructed in a variety of materials and which is configured to support a plumb line for referencing the corner region to during construction thereof. The device is adjustable, non-complex, accurate, compact, hardwearing, lightweight, and minimises labour time, cost, tools, material and energy usage.

The invention claimed is:

1. A device for suspending a plumb line over a corner region of a wall to be built, comprising:
    an elongate support member having a first end region and a second end region;
    a first locating region disposed proximal the first end region and comprising a pair of first engagement surfaces defining a first angle there-between dissected substantially equally by a longitudinal axis of the elongate support member, the pair of first engagement surfaces being configured for engaging respective inner corner faces of an inner leaf of a part-built cavity wall construction;
    a second locating region disposed between the first end region and the second end region and comprising a pair of second engagement surfaces defining a second angle there-between dissected substantially equally by the longitudinal axis of the elongate support member, the pair of second engagement surfaces being configured engaging respective outer corner faces of the inner leaf of the part-built cavity wall construction;
    a first coupling member slidably mounted to the elongate support member to couple the second locating region to the elongate support member, wherein the first coupling member is selectively movable along the elongate support member for adjustment of a position of the pair of second engagement surfaces relative to the pair of first engagement surfaces; and
    a second coupling member for coupling a plumb line proximal to the second end region of the elongate support member, wherein the second coupling member is selectively movable along the elongate support member and selectively rotatable about the elongate support member for adjustment of a position of the plumb line in at least one of a longitudinal or a lateral direction relative to the longitudinal axis of the elongate support member.

2. The device as claimed in claim 1, wherein at least one of the first locating region or the second locating region is selectively rotatable relative to the elongate support member.

3. The device as claimed in claim 1, wherein the first angle is approximately 90°.

4. The device as claimed in claim 1, wherein each of the first engagement surfaces comprises at least one through hole.

5. The device as claimed in claim 1, wherein the second angle is substantially the same as the first angle.

6. The device as claimed in claim 1, wherein the first coupling member is configured to selectively rotate relative to the elongate member.

7. The device as claimed in claim 1, wherein the first coupling member comprises a first locking element to lock the first coupling member and second engagement surfaces in a specific position and/or orientation relative to the elongate support member.

8. The device as claimed in claim 1, wherein the second coupling member is slidably mounted to the elongate support member proximal the second end region thereof.

9. The device as claimed in claim 1, wherein the second coupling member comprises a second locking element to lock the second coupling member in a desired position and/or orientation relative to the elongate support member.

10. The device as claimed in claim 1, wherein the second coupling member comprises an attachment element for attaching a plumb line thereto.

11. A kit comprising a device as claimed in claim 1 and a plumb line.

12. A method of suspending a plumb line over a corner region of a wall to be built, comprising the steps of:
engaging a pair of first engagement surfaces of a first locating region disposed proximal a first end region of an elongate support member with respective inner corner faces of an inner leaf of a part-built cavity wall construction, wherein the first engagement surfaces define a first angle there-between dissected substantially equally by a longitudinal axis of the elongate support member;
selectively moving a pair of second engagement surfaces of a second locating region disposed between the first end region and a second end region of the elongate support member towards the first locating region such that the second locating region respective outer corner faces of the inner leaf of the part-built cavity wall construction, the second engagement surfaces defining a second angle there-between that is dissected substantially equally by the longitudinal axis of the elongate support member; and
coupling a plumb line proximal to the second end region of the elongate support member,
wherein:
the second locating region is coupled to the elongate support member by a first coupling member slidably mounted thereto, the first coupling member being selectively movable along the elongate support member to allow a position of the second engagement surfaces to be adjusted relative to the first engagement surfaces, and
the plumb line is coupled to the elongate support member by a second coupling member selectively moveable along the elongate support member and selectively rotatable about the elongate support member to allow a position of the plumb line to be adjusted in a longitudinal and/or lateral direction relative to a longitudinal axis of the elongate support member.

13. The method as claimed in claim 12, further comprising the step of selectively rotating at least one of the first locating region or the second locating region about the longitudinal axis of the elongate support member.

14. The method as claimed in claim 12, further comprising the step of sliding the first coupling member along the elongate support member to move the second locating region towards or away from the first locating region.

15. The method as claimed in claim 14, further comprising the step of locking the first coupling member in at least one of a specific position or a specific orientation relative to the elongate support member.

16. The method as claimed in claim 12, further comprising the step of at least one of selectively translating the second coupling member along the elongate support member or rotating the second coupling member about the elongate support member to accurately position the plumb line.

17. The method as claimed in claim 16, further comprising the step of locking the second coupling member in at least one of a specific position or a specific orientation relative to the elongate support member.

* * * * *